(12) United States Patent
Buell

(10) Patent No.: US 6,259,619 B1
(45) Date of Patent: Jul. 10, 2001

(54) EL DRIVER WITH REDUCED PIN COUNT

(75) Inventor: Brian Jeffrey Buell, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/649,898

(22) Filed: Aug. 28, 2000

Related U.S. Application Data

(62) Division of application No. 09/346,328, filed on Jul. 2, 1999, now Pat. No. 6,181,589.

(51) Int. Cl.$^7$ ................................................ H02M 7/5387
(52) U.S. Cl. ............................................................. 363/147
(58) Field of Search ............................................... 363/147

(56) References Cited

U.S. PATENT DOCUMENTS

| | | | |
|---|---|---|---|
| 4,527,096 | 7/1985 | Kindlmann | 315/169.3 |
| 4,529,322 * | 7/1985 | Ueda | 368/255 |
| 4,533,986 | 8/1985 | Jones | 363/17 |
| 4,670,833 * | 6/1987 | Sachs | 363/147 |
| 4,918,590 * | 4/1990 | Ohtuka et al. | 363/147 |
| 5,027,040 | 6/1991 | Ikeda et al. | 315/241 R |
| 5,043,859 * | 8/1991 | Korman et al. | 363/147 |
| 5,060,130 | 10/1991 | Steigerwald | 363/65 |
| 5,229,927 * | 7/1993 | Vila-Masot et al. | 363/132 |
| 5,262,699 * | 11/1993 | Sun et al. | 363/132 |
| 5,313,141 | 5/1994 | Kimball | 315/169.3 |
| 5,323,305 | 6/1994 | Ikeda et al. | 363/98 |
| 5,336,978 * | 8/1994 | Alessio | 363/132 |
| 5,382,882 * | 1/1995 | Nerone | 315/307 R |
| 5,502,357 * | 3/1996 | Kimball | 315/209 |
| 5,566,064 | 10/1996 | Schoenwald et al. | 363/132 |
| 5,619,106 * | 4/1997 | Secen | 315/290 |
| 6,181,589 * | 1/2001 | Buell | 363/132 |

* cited by examiner

Primary Examiner—Jeffrey Sterrett
(74) Attorney, Agent, or Firm—Paul F. Wille

(57) ABSTRACT

An inverter for driving an EL lamp includes a half-bridge output. The inverter can be implemented in junction isolation processes, among others, on smaller die than in the prior art in a package with a lower pin count than known circuits of the same functionality.

6 Claims, 1 Drawing Sheet

EL DRIVER WITH REDUCED PIN COUNT

CROSS-REFERENCE TO RELATED APPLICATION

This application is a division of Application Ser. No. 09/346,328 filed Jul. 2, 1999, now U.S. Pat. No. 6,181,589.

BACKGROUND OF THE INVENTION

This invention relates to battery operated converters for driving an electroluminescent (EL) lamp and, in particular, to a half-bridge converter having an alternating current (AC) ground.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by a converter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of inverters in which the energy stored in an inductor is supplied to an EL lamp as a small current at high voltage as the inductor is discharged through the lamp. The voltage on the lamp is pumped up by a series of pulses from the inverter. The direct current produced by inverter must be converted into an alternating current in order to power an EL lamp. U.S. Pat. No. 4,527,096 (Kindlmann) discloses a switching bridge for this purpose. U.S. Pat. No. 5,313,141 (Kimball) discloses an alternative design that produces an AC voltage directly.

It is also known in the art to drive an EL lamp with a push-pull output rather than a full bridge as in the Kindlmann patent; see U.S. Pat. No. 5,566,064 (Shoenwald et al.). Although the Shoenwald et al. patent refers to a bridge, the circuit is actually push-pull because the emitters of the switching transistors are grounded; that is, one terminal of what would be an AC diagonal of a bridge circuit is grounded. In an actual bridge circuit, one end of the DC diagonal is grounded.

Half-bridge inverters are known in the power supply art, e.g. U.S. Pat. No. 4,533,986 (Jones) and 5,060,130 (Steigerwald). These patents describe switching power supplies producing several watts of power, or more, and having direct current outputs.

Many applications for EL lamps, such as watches and cellular telephones, require small, inexpensive drivers. The Kimball design requires dielectric isolation to implement, a relatively expensive process. The full bridge requires four switching transistors, which makes the die relatively large and, therefore, expensive. The push-pull design described in the Shoenwald et al. patent has only two switching transistors but requires at least nine pins to implement. It is desired to minimize pin count, in addition to minimizing die size, the combination of which can significantly reduce the cost of a packaged device. The Shoenwald et al. design also requires more than one inductor, making the total cost of the circuit extremely high relative to other designs.

There are relatively simple circuits known in the art for driving an EL lamp and such circuits, if implemented as an integrated circuit, might have few pins. However, these circuits compromise operation, typically by producing a DC bias on the EL lamp, which greatly shortens the life of the lamp.

In view of the foregoing, it is therefore an object of the invention to provide a true half-bridge inverter for EL lamps.

Another object of the invention is to provide an inverter that can be implemented in a junction isolation process, among others.

A further object of the invention is to provide an inverter for an EL lamp that can be implemented as an integrated circuit with fewer pins than circuits in the prior art with the same functionality.

Another object of the invention is to provide an inverter for an EL lamp that can be implemented as an integrated circuit of small die size.

The foregoing objects are achieved in this invention in which an inverter for driving an EL lamp includes a half-bridge output.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
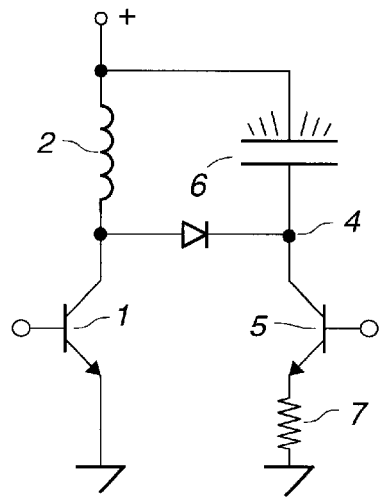
FIG. 1 is a schematic of a known boost circuit driving an EL lamp.

FIG. 1 is the schematic of an inverter disclosed as prior art in U.S. Pat. No. 4,529,322 (Ueda). In this inverter, transistor 1 is switched on and off at about eight kilohertz. When transistor 1 turns on, current flows through inductor 2, storing energy in the magnetic field generated by the inductor. When transistor 1 shuts off, the magnetic field collapses at a rate determined by the turn-off characteristics of the transistor. The voltage across inductor 2 is proportional to the rate at which the field collapses. A large positive voltage is developed at node 4.

When transistor 5 conducts, lamp 6 discharges. The current through the lamp is pulsating DC, not AC. The pulsating DC causes a residual DC bias across lamp 6. DC bias on an EL lamp can cause corrosion and shorting of the electrodes of the lamp, particularly at elevated temperature and humidity, decreasing the life of the lamp. In watch applications, a DC bias can be tolerated because the lamp is not used often and the life of the lamp far exceeds the life of the watch. In other applications, DC bias is a problem. Another problem with the circuit shown in FIG. 1 is that transistor 5 draws current from the supply terminal through diode 6.

Figure 2:
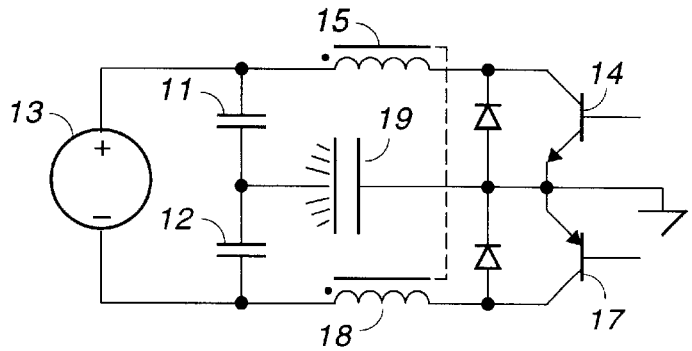
FIG. 2 is a schematic of a push-pull inverter of the prior art.

FIG. 2 is based upon a figure in the Shoenwald et al. patent. In FIG. 2, capacitors 11 and 12 are connected in series across high voltage DC supply 13. EL lamp 19 is connected between ground and the junction of capacitors 11 and 12. Transistor 14 and inductor 15 are series connected between the positive side of supply 13 and ground, while transistor 17 and inductor 18 are connected between the negative side of supply 13 and ground. Inductors 15 and 18 are coupled magnetically and are phased as indicated by the small dots.

Transistors 14 and 17 conduct alternately under the control of external logic (not shown) to cause alternating current to flow through lamp 19. The grounded emitters of transistors 14 and 17 prevent the circuit from being considered a "half bridge" circuit, as that term is normally used. A half bridge circuit is a bridge circuit cut along the DC diagonal.

Figure 3:
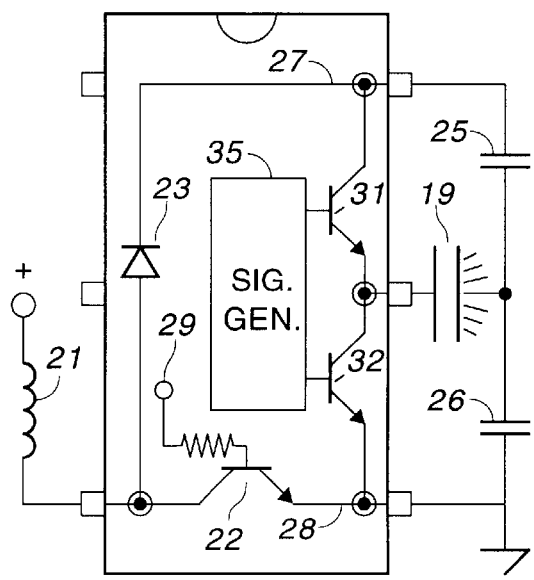
FIG. 3 is a schematic of a battery powered inverter constructed in accordance with the invention.

FIG. 3 is a schematic of a preferred embodiment of the invention implemented as a battery operated inverter. A boost circuit including inductor 21, transistor 22 and diode 23 converts low voltage DC into high voltage DC pulses that are stored in series connected capacitors 25 and 26. The boost circuit is controlled by a suitable pulse generator (not shown) coupled to input 29. The positive side of capacitor 25 is coupled to high voltage rail 27 and the negative side of capacitor 26 is coupled to common rail 28.

Transistors 31 and 32 are connected in series with each other between the rails and in parallel with capacitors 25 and 26, forming a bridge having capacitors in two adjoining legs and switching transistors in two adjoining legs. EL lamp 19 is coupled between the junction of capacitors 25 and 26 and the junction of transistors 31 and 32. Transistors 31 and 32 conduct alternately under the control of signal generator 35. Transistors 31 and 32 switch at a low frequency, e.g. 100–1,000 Hz, and transistor 22 switches at high frequency, e.g. 8,000–20,000 Hz or higher.

When transistor 31 conducts, lamp 19 is coupled in parallel with capacitor 25 and is charged to the voltage on capacitors 25, with the current flowing from right to left as the lamp is shown. The right-hand side of lamp 19 is now positively charged. At some point, transistor 31 turns off and transistor 32 turns on, coupling lamp 19 in parallel with capacitor 26 and grounding the right-hand side of lamp 19. Lamp 19 discharges and charges to the voltage on capacitor 26, with the current flowing from left to right through the lamp.

Transistors 31 and 32 can be operated as switches, i.e. either off or fully conducting, or as loads (partially conducting) to limit the discharge current through lamp 19. Small switching transistors having a relatively large on resistance can be used instead. It is preferred to limit the charging current and the discharging current to reduce noise in EL lamp 19.

Figure 4:
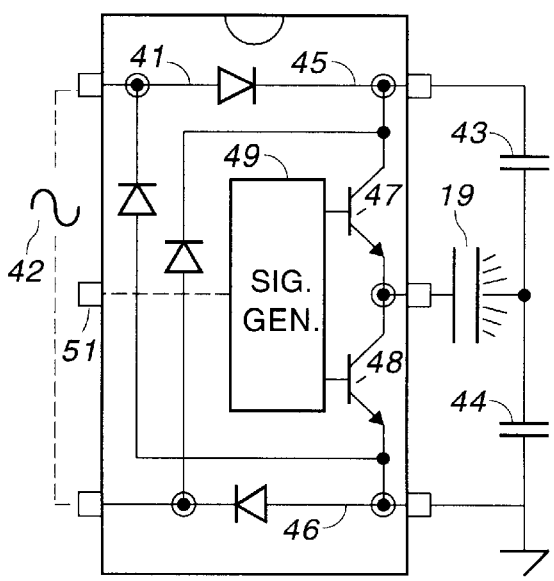
FIG. 4 is a schematic of a line powered inverter constructed in accordance with the invention.

An EL lamp should not be driven from 50/60 Hz line current because the frequency is too low for optimal operation of the lamp. FIG. 4 illustrates an inverter powered by line current for driving an EL lamp at the proper voltage and frequency. Bridge 41 is a full wave rectifier bridge for converting line current, represented by sinusoidal waveform 42, into direct current that is applied to series connected capacitors 43 and 44. The positive side of capacitor 43 is coupled to high voltage rail 45 and the negative side of capacitor 44 is coupled to common rail 46. Transistors 47 and 48 conduct alternately under the control of signal generator 49 to produce an alternating current through EL lamp 19.

Each of the embodiments of FIGS. 3 and 4 require no more than five pins per packaged die, as represented by the circles around connection points in the figures. In FIG. 4, the circuit could be implemented with three pins if the rectifying bridge were external. This greatly reduces die size and packaging costs. Power for the signal generator, on the order of microwatts for a CMOS circuit, is derived from the voltage on the series capacitors. Lamp 19 is floating, not resistively grounded. The series capacitors provide an AC ground but not a resistive or DC ground. Note too that one end of the DC diagonal of the bridge is grounded, in true half-bridge configuration.

The invention thus provides a true half-bridge inverter for EL lamps that can be implemented in a junction isolation process, among others, as an integrated circuit with at least one less pin than prior art circuits of similar functionality. An inverter constructed in accordance with the invention can be implemented as an integrated circuit having a small die size. With a reduced pin count and small die size, the inverter is less expensive to build than inverters of the prior art.

Having thus described the invention, it will be apparent to those of skill in the art that various modifications can be made within the scope of the invention. For example, the power drawn by an EL lamp and the inverter circuitry is so low that a full wave rectifier is not necessary when operating from line voltage. A half wave rectifier is adequate. The flavor (PNP or NPN), polarity (e.g. emitter to collector, emitter to emitter) and type (e.g. bipolar, FET) of the series transistors can be varied to suit an application or a particular fabrication process. As used herein, a "pin" is an external lead from a packaged die, regardless of the size or shape of the lead or how the die is attached to a larger circuit. The signal for driving transistor 22 can be derived from the same source as the signals for transistors 31 and 32 or be derived from a separate source. At the cost of an additional pin, one could add a dimming input to the signal generator. For example, optional input 51 (FIG. 3) controls pulse width modulation and, therefore, brightness. At worst, the pin count is raised to six; four if the bridge rectifier is external. Resistors can be included in series with each of the series connected transistors to provide current limiting if the on-resistance of the transistors is too low. Alternatively, the series connected transistors can be operated as constant current loads.

What is claimed as the invention is:

1. An inverter for driving an electroluminescent lamp, said inverter comprising:
   a half-bridge output including a pair of transistors connected in series;
   said inverter being implemented in a single semiconductor die in a package having six pins or fewer, wherein said die includes said pair of transistors connected in series between a first pin and a second pin and having the junction of the transistors coupled to a third pin;
   said semiconductor die further including a signal generator coupled to said first transistor and to said second transistor for causing said first transistor and said second transistor to conduct alternately.

2. The inverter as set forth in claim 1 wherein said first pin is a high voltage input and said second pin is circuit common.

3. The inverter as set forth in claim 1 and further including:
   a voltage boost circuit including a third transistor coupled between said second pin and a fourth pin of said package.

4. The inverter as set forth in claim 3 and further including a diode coupled between said fourth pin and said first pin.

5. The inverter as set forth in claim 1 and further including a fourth pin, a first diode coupled between said first pin and said fourth pin, and a second diode coupled between said second pin and said fourth pin.

6. The inverter as set forth in claim 5 and further including a fifth pin, a third diode coupled between said first pin and said fifth pin, and a fourth diode coupled between said second pin and said fifth pin, wherein said the four diodes are coupled as a full wave rectifier.

* * * * *